United States Patent
Hino et al.

(10) Patent No.: US 9,093,927 B2
(45) Date of Patent: Jul. 28, 2015

(54) ACTUATOR WITH IONIC LIQUID

(71) Applicant: CANON KABUSHIKI KAISHA, Tokyo (JP)

(72) Inventors: Tetsuo Hino, Yamato (JP); Sakae Suda, Yokohama (JP); Jun Yamamoto, Tokyo (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/671,293

(22) Filed: Nov. 7, 2012

(65) Prior Publication Data
US 2013/0119821 A1    May 16, 2013

(30) Foreign Application Priority Data

Nov. 10, 2011    (JP) ................................. 2011-246713

(51) Int. Cl.
*H02N 11/00* (2006.01)
*H02N 2/00* (2006.01)
*H01L 41/18* (2006.01)
*B82Y 40/00* (2011.01)

(52) U.S. Cl.
CPC ............... *H02N 11/006* (2013.01); *B82Y 40/00* (2013.01)

(58) Field of Classification Search
CPC .............................. H02N 11/00; H02N 11/06
USPC ........... 310/300, 303, 313 B, 323.02, 323.06, 310/358, 362, 364–365
See application file for complete search history.

(56) References Cited

U.S. PATENT DOCUMENTS

| | | | | |
|---|---|---|---|---|
| 4,518,737 A | * | 5/1985 | Traut | 524/413 |
| 4,869,577 A | * | 9/1989 | Masaki | 349/128 |
| 7,733,000 B2 | * | 6/2010 | Kudoh | 310/332 |
| 2007/0114116 A1 | * | 5/2007 | Nagai et al. | 200/181 |
| 2008/0023333 A1 | * | 1/2008 | Johnson | 204/554 |
| 2008/0048555 A1 | * | 2/2008 | Aoyama et al. | 313/503 |
| 2010/0066203 A1 | * | 3/2010 | Takeuchi et al. | 310/300 |
| 2010/0079838 A1 | * | 4/2010 | Sano et al. | 359/228 |
| 2011/0050048 A1 | * | 3/2011 | Suda et al. | 310/363 |
| 2011/0227455 A1 | * | 9/2011 | Nagamitsu et al. | 310/333 |

FOREIGN PATENT DOCUMENTS

| | | |
|---|---|---|
| JP | 5-5905 A | 1/1993 |
| JP | 9-63905 A | 3/1997 |
| JP | 2000-81627 A | 3/2000 |
| JP | 2005-176428 A | 6/2005 |

OTHER PUBLICATIONS

Shigeru Tasaka, Journal of the Society of Fiber Sciencetrans, Research on Orientation Control of Chains and Dipoles in Polar Polymers, 10 pages.

* cited by examiner

*Primary Examiner* — Joshua Benitez-Rosario
*Assistant Examiner* — Jose Gonzalez Quinone
(74) *Attorney, Agent, or Firm* — Canon U.S.A. Inc., IP Division

(57) ABSTRACT

An actuator includes a pair of electrodes facing each other, an intermediate layer containing an ionic liquid and arranged between the pair of electrodes, the electrodes and the intermediate layer being deformed when a potential difference larger than a potential window of the ionic liquid is applied between the electrodes, and insulating layers that suppress direct contact between ions of the ionic liquid and the electrodes, the insulating layers being arranged between the intermediate layer and the electrodes.

11 Claims, 3 Drawing Sheets

ACTUATOR WITH IONIC LIQUID

BACKGROUND OF THE INVENTION

1. Field of the Invention

The present invention relates to an actuator.

2. Description of the Related Art

Recently, ion migration-type actuators utilizing ionic liquids have been developed. Ionic liquids have a feature that the potential window is wider by 1 V or more than that of electrolyte solvents containing a supporting electrolyte and a solvent, and a relatively high operating voltage of about ±3 V can be set compared with such electrolyte solvents.

Japanese Patent Laid-Open No. 2005-176428 (Patent Literature 1) discloses an ion migration-type actuator including a pair of long electrodes containing a conductive carbon material (carbon nanotubes), an ionic liquid, and an organic polymer and an intermediate layer containing an ionic liquid and an organic polymer, the intermediate layer being arranged between the pair of electrodes. In this actuator, when a potential difference is applied between two electrodes 300 and 301 (FIG. 4A) that are formed on the surfaces of an intermediate layer 200 so as to be insulated from each other, a cation 700 and an anion 600 of an ionic liquid 800 respectively migrate to an electrode 301 functioning as a cathode and an electrode 300 functioning as an anode (FIG. 4B). Consequently, an electric double layer is formed at an interface between the conductive material phase in each of the electrodes 300 and 301 and the ionic material phase. The ionic radius of the cation 700 of the ionic liquid is larger than that of the anion 600 thereof. As a result, a steric effect of the ions that migrate to the electrodes and electrostatic repulsion caused by the formation of the electric double layer collaboratively act, and thus the electrode 301 significantly extends as compared with the electrode 300. Thus, the actuator is driven by being bent and deformed in a direction in which the cathode extends more significantly than the anode. When the polarity of the electric potential is inverted, the actuator element is usually bent and deformed in the opposite direction. This actuator is driven at a maximum operating voltage of ±3V.

However, when a potential difference larger than the potential window of the ionic liquid is applied to the above actuator described in Patent Literature 1, the ionic liquid is electrochemically decomposed, resulting in degradation of the driving of the actuator. Specifically, even if a strong electric field is applied to the actuator so as to promote the migration of the ions, a potential difference larger than the potential window of the ionic liquid cannot be applied. As a result, improvement in the force generated by the actuator has been limited.

SUMMARY OF THE INVENTION

The present invention provides an actuator utilizing an ionic liquid and capable of generating a large force.

An actuator according to an aspect of the present invention includes a pair of electrodes facing each other, an intermediate layer containing an ionic liquid and arranged between the pair of electrodes, the electrodes and the intermediate layer being deformed when a potential difference larger than a potential window of the ionic liquid is applied between the electrodes, and insulating layers that suppress direct contact between ions of the ionic liquid and the electrodes, the insulating layers being arranged between the intermediate layer and the electrodes.

According to the aspect of the present invention, direct contact between an ion of an ionic liquid and an electrode is suppressed by an insulating layer. Accordingly, even when a potential difference larger than the potential window of the ionic liquid is applied, electrochemical oxidation and reduction of ions of the ionic liquid can be suppressed. Consequently, a high voltage can be applied between electrodes, and thus an actuator that generates a large force can be provided. In addition, an actuator having high driving durability and stability can also be provided.

Further features of the present invention will become apparent from the following description of exemplary embodiments with reference to the attached drawings.

DESCRIPTION OF THE EMBODIMENTS

Embodiments of the present invention will now be described.

Structure of Actuator

An actuator according to an embodiment of the present invention will be described with reference to FIG. 1.

The actuator according to an embodiment of the present invention includes, as displacement portions that deform, a pair of electrodes 11 and 12 facing each other and an intermediate layer 15 containing an ionic liquid and arranged between the pair of electrodes 11 and 12.

The actuator is configured so that the displacement portions deform when a potential difference larger than the potential window of the ionic liquid is applied between the electrodes 11 and 12.

This actuator is characterized in that insulating layers 13 and 14, each of which suppresses direct contact between an ion of the ionic liquid and the electrode, are arranged between the intermediate layer 15 and each of the pair of electrodes 11 and 12.

Figure 1:
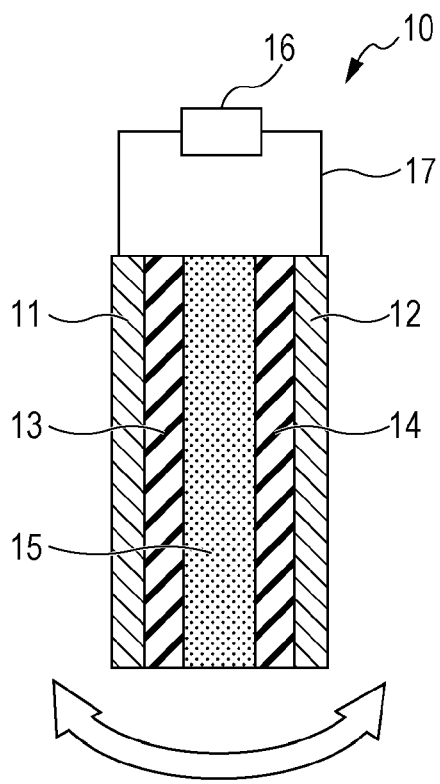
FIG. 1 is a schematic view of a five-layer-structured strong electric field application-type actuator 10 including insulating layers according to an embodiment of the present invention.

FIG. 1 is a schematic view of an actuator 10 according to an embodiment of the present invention, viewed from a direction perpendicular to a direction (horizontal direction of the drawing) in which electrodes, an intermediate layer, and insulating layers comprising a high dielectric material are stacked. The actuator 10 has a five-layer structure in which a pair of electrodes 11 and 12 and an intermediate layer 15 containing an ionic liquid and arranged between the electrodes 11 and 12 are stacked with insulating layers 13 and 14 therebetween. Each of the electrodes 11 and 12 is connected to a driving power supply 16 through a lead wire 17.

The intermediate layer 15 of this actuator 10 contains at least an ionic liquid. Accordingly, when a voltage is applied to the actuator element by the driving power supply 16, a potential difference is applied between the electrode 11 and the electrode 12 and ions in the ionic liquid contained in the intermediate layer 15 are attracted to the electrodes 11 and 12. As a result, the ions migrate to the side faces of the intermediate layer 15, the side faces being located in the vicinity of the anode and the cathode (there is a difference in size between the cationic species and the anionic species), and an end (displacement end) of the actuator having a long shape is bent and deformed in the directions indicated by the double-sided block arrow in FIG. 1.

In the actuator of this embodiment, direct contact between the ionic liquid and each electrode is suppressed by the insulating layer. Accordingly, even when a potential difference larger than the potential window of the ionic liquid is applied to the ionic liquid (and the ionic species thereof), electrochemical oxidation and reduction of the ionic liquid can be suppressed. As a result, a large potential difference can be applied compared with a case of the existing actuator having a three-layer structure of electrode/intermediate layer/electrode. Specifically, by generating a large potential difference between the electrodes, ions of the ionic liquid can be efficiently migrated to side faces of the intermediate layer, the side faces being located in the vicinity of the anode and the cathode.

Furthermore, in order to obtain a structure in which an electric potential higher than the potential window of an ionic liquid can be applied, a difference in the potential applied between the electrodes of the actuator element, the dielectric constants of the insulating layers and the intermediate layer, and the distances between capacitors (film thicknesses) of the insulating layers and the intermediate layer satisfy the relationships derived from formulae below.

Specifically, the actuator according to an embodiment of the present invention is considered as a structure in which three capacitors are arranged in series. The capacitances of first insulating layer/intermediate layer/second insulating layer are represented by $C_1$, $C_2$, and $C_3$, respectively. The capacitance of the actuator according to the embodiment of the present invention is a total capacitance ($C_{total}$) of $C_1$, $C_2$, and $C_3$ and thus can be represented by formula A below.

$$1/C_{total} = 1/C_1 + 1/C_2 + 1/C_3 \quad \text{Formula A}$$

A difference $V_2$ in the potential applied to the intermediate layer is represented by formula B:

$$V_2 = (C_{total}/C_2) \times V_{ext} \quad \text{Formula B}$$

where $V_{ext}$ represents a difference in the potential applied between the electrodes of the actuator element.

The capacitance of a capacitor is represented by formula C below:

$$C = \epsilon S/d \quad \text{Formula C}$$

where $\epsilon$ represents the dielectric constant, S represents the electrode area, and d represents the distance between capacitors (film thickness).

Accordingly, when the magnitude of the potential window of the ionic liquid is represented by $\delta$, $V_2$ is represented by formula D below, and can be converted to formula E using formula C.

$$V_2 = [(C_{total}/C_2) \times V_{ext}] > \delta \quad \text{Formula D}$$

$$= [\{(C_1 \times C_3 \times V_{ext}) - (C_1 \times C_3 \times \delta)\}/(C_1 + C_3)] > \delta C_2 \quad \text{Formula E}$$

Herein, the dielectric constant, the electrode area, and the distance between capacitors of the first insulating layer, the intermediate layer, and the second insulating layer are respectively represented by $\epsilon_1$, $\epsilon_2$, and $\epsilon_3$, $S_1$, $S_2$, and $S_3$, and $d_1$, $d_2$, and $d_3$. In addition, $S_1 = S_2 = S_3$ is satisfied. Accordingly, in order to apply a potential higher than the potential window of the ionic liquid to the intermediate layer ($V_2 > \delta$), it is necessary that $\epsilon_1$ and $\epsilon_3$ and $d_1$ and $d_3$ satisfy the relationship represented by formula F:

$$[(\epsilon_1 \times \epsilon_3)/\{(\epsilon_1 \times d_3) + (\epsilon_3 \times d_1)\}] \times (V_{ext} - \delta) > \delta(\epsilon_2/d_2) \quad \text{Formula F}$$

Furthermore, in the case where the first insulating layer is the same as the second insulating layer, that is, $\epsilon_1 = \epsilon_3$ and $d_1 = d_3$, formula F can be converted to formula G.

$$[\{\epsilon_1 \times (V_{ext} - \delta)\}/2d_1] > \delta(\epsilon_2/d_2) \quad \text{Formula G}$$

In addition, it is necessary that the relationship between a dielectric breakdown electric field ($E_c$) and a difference in the potential applied to each of the first insulating layer/intermediate layer/second insulating layer and the thickness of each of the layers be represented by formula H:

$$E_c > (V_1/d_1), (V_2/d_2), \text{ and } (V_3/d_3) \quad \text{Formula H}$$

where $V_1$ represents a difference in the potential applied to the first insulating layer, and $V_3$ represents a difference in the potential applied to the second insulating layer.

With the structure that satisfies the above relationships, it is possible to apply a potential difference larger than the potential window of the ionic liquid to the intermediate layer in the actuator element, and thus to obtain an actuator utilizing an ionic liquid and capable of generating a large force.

Furthermore, the force generated by an actuator is further improved when an intermediate layer of the actuator having a five-layer structure of electrode/insulating layer/intermediate layer/insulating layer/electrode has ion adsorption portions containing at least a nano-carbon material in the vicinity of surfaces that contact the insulating layers. In particular, the ion adsorption portions may be arranged in the form of layers at interfaces between the intermediate layer and each of the insulating layers.

Figure 2:
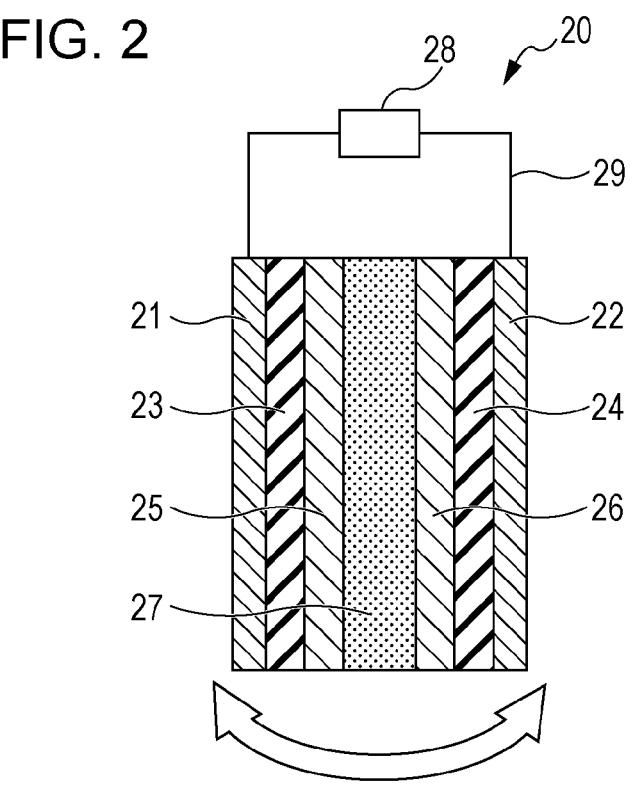
FIG. 2 is a schematic view of a seven-layer-structured actuator 20 which includes insulating layers and an intermediate layer having ion adsorption portions containing at least a nano-carbon material at interfaces contacting the insulating layers according to an embodiment of the present invention.

Specifically, an actuator 20 illustrated in FIG. 2 has a seven-layer structure of electrode (21)/insulating layer (23)/ion adsorption portion (25)/intermediate layer (27)/ion adsorption portion (26)/insulating layer (24)/electrode (22). Each of the electrodes 21 and 22 is connected to a driving power supply 28 through a lead wire 29. In the actuator 20 illustrated in FIG. 2, the ion adsorption portions containing the nano-carbon material each have a high specific surface area for ion adsorption. That is, the ion adsorption portions can efficiently accumulate a cationic species and an anionic species of an ionic liquid that are attracted to the electrode functioning as a cathode and the electrode functioning as an anode and that migrate to the vicinity of the interfaces with the insulating layers. Thus, the force generated by the actuator is further improved.

Furthermore, in the case where each of the insulating layers comprises a resin containing an inorganic substance and the inorganic substance is a high dielectric ceramic, an actuator including insulating layers having an extremely high dielectric constant can be easily prepared. Such insulating layers comprising a high dielectric material have a satisfactory dielectric constant, and thus an electric field can be efficiently applied to the intermediate layer. Furthermore, in such insulating layers, a good polarization inversion characteristic can be achieved, and thus a satisfactory symmetric property in AC drive can also be achieved. Accordingly, in this case, an actuator that generates a larger force and that can stably utilize an ionic liquid for driving can be easily prepared.

Figure 4A:
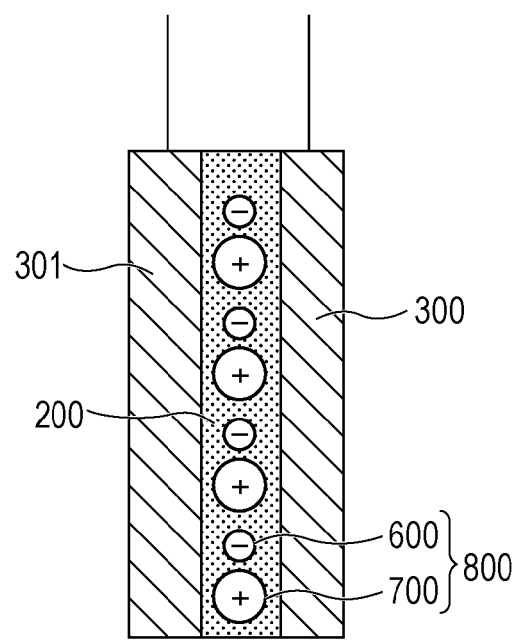
FIG. 4A is a schematic view of an existing actuator before a voltage is applied.
Figure 4B:
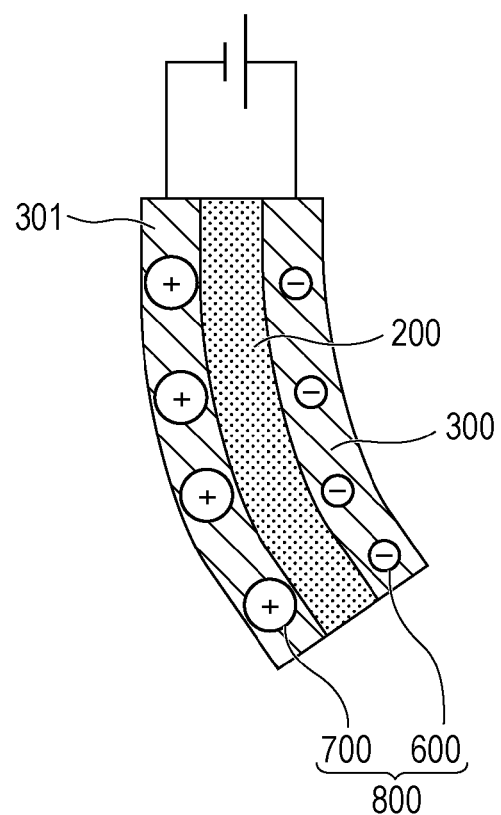
FIG. 4B is a schematic view illustrating migration of ions and the state of bending of the existing actuator after a voltage is applied, the bending being caused by the migration of the ions.

As described above, in the existing actuator having the three-layer structure of electrode/intermediate layer/electrode, a cationic species and an anionic species of an ionic liquid respectively migrate to an electrode functioning as a cathode and an electrode functioning as an anode by applying a potential difference between the electrodes. Since the ionic radius of the cation is larger than that of the anion, the actuator is bent and deformed in a direction in which the cathode extends more significantly than the anode (FIG. 4B). However, a potential difference larger than the potential window of the ionic liquid cannot be applied because each of the electrodes and the intermediate layer containing the ionic liquid directly contact with each other. That is, the migration efficiency of the ions is not high.

In the actuator having insulating layers according to an embodiment of the present invention, the actuator having the five-layer structure of electrode/insulating layer/intermediate layer/insulating layer/electrode, by applying a voltage between the electrodes, an anionic species and an cationic species of the ionic liquid are respectively attracted to the electrode functioning as a cathode and the electrode functioning as an anode and migrate to the vicinity of interfaces with the insulating layers. In this structure, the actuator can be deformed while avoiding direct contact between each of the electrodes and the intermediate layer containing the ionic liquid. In addition, with "the structure in which deformation in driving is caused by applying a potential difference larger than the potential window of the ionic liquid to the intermediate layer", that is, with the structure that satisfies formula F and formula H described above, which is another feature of the present invention, the migration efficiency of the ions can be increased. In other words, in this structure, a potential difference larger than the potential window of an ionic liquid can be applied to the intermediate layer, which has not been realized to date, and thus the cationic species and the anionic species of the ionic liquid are efficiently attracted to the electrode functioning as a cathode and the electrode functioning as an anode, respectively, and can be migrated to the vicinity of the interfaces with the insulating layers.

As a result, an actuator utilizing an ionic liquid and capable of generating a large force can be provided.

In addition, since the ionic liquid does not contact the electrodes, the actuator is very electrically stable. Thus, an actuator having high driving durability and high stability can be provided.

In the above-described five-layer-structured actuator, each of the insulating layers may comprise a resin containing an inorganic substance and the inorganic substance may be a high dielectric ceramic. In such an actuator having a five-layer structure of electrode/highly dielectric insulating layer/intermediate layer/highly dielectric insulating layer/electrode, by applying a voltage between the electrodes, the cationic species and the anionic species of the ionic liquid are respectively attracted to the electrode functioning as a cathode and the electrode functioning as an anode and migrate to the vicinity of interfaces with the insulating layers as in the above five-layer-structured actuator. Also in this structure, since each of the electrodes and the intermediate layer containing the ionic liquid do not directly contact with each other, a potential difference larger than the potential window of the ionic liquid can be applied. Furthermore, as described above, when the insulating layers comprise a high dielectric material, a large potential applied between the electrodes can be applied to the intermediate layer while minimizing the loss of the potential difference in a portion of the insulating layers.

Specifically, on the basis of formula D, the difference $V_2$ in the potential applied to the intermediate layer is also represented by formula X below, and it is found that, with an increase in the dielectric constants ($\epsilon_1$ and $\epsilon_3$) of the insulating layers, the loss of the potential difference decreases.

$$V_2=\{(\epsilon_1\times\epsilon_3)/(d_1\times d_3)\}/[\{(\epsilon_2\times\epsilon_3)/(d_2\times d_3)\}+\{(\epsilon_1\times\epsilon_3)/(d_1\times d_3)\}+\{(\epsilon_1\times\epsilon_2)/(d_1\times d_2)\}]\times V_{ext} \quad \text{Formula X}$$

Accordingly, when insulating layers comprising a high dielectric material are used, it is possible to increase the efficiency in which an anionic species and a cationic species of an ionic liquid are respectively attracted to the electrode functioning as a cathode and the electrode functioning as an anode and migrate to the vicinity of the interfaces with the insulating layers. In addition, in the case of the above insulating layers, a good polarization inversion characteristic is achieved and thus a satisfactory symmetric property in AC drive is also achieved.

As a result, it is possible to obtain an actuator capable of generating a larger force, having a satisfactory symmetric property in AC drive, and utilizing an ionic liquid as an electrolyte solvent.

Actuators according to embodiments of the present invention have been described using, as examples, cases where a cross section perpendicular to the stacking direction is a rectangle. However, the cross sectional shape may be selected from various shapes such as a circular shape, a triangular shape, and an elliptical shape besides a rectangular flat-plate shape.

In the embodiments, the actuator may have a composite structure including a single or a plurality of elements.

Furthermore, at least a part of the outer surfaces of the electrodes of the actuator may be covered with a flexible insulating film or sealing film. The actuator may have any stacking structure in accordance with the predetermined performance as long as the actuator has, as a basic structural unit, the five-layer structure illustrated in FIG. 1 or the seven-layer structure illustrated in FIG. 2, and is driven by causing deformation.

The voltage applied to the actuator according to an embodiment of the present invention may be freely determined as long as the ionic liquid, the electrodes, the intermediate layer, and the insulating layers are not decomposed. However, the voltage is, for example, 50 V or less.

Electrodes

Examples of the electrodes include, but are not particularly limited to, metal electrodes, conductive polymers, compacts of a conductive material such as carbon nanotubes (CNTs), e.g., buckypaper, and single-film-like flexible electrodes containing at least a conductive material such as CNTs and a polymer. Electrodes known as electrodes of actuators comprising organic polymers (soft actuators) can be appropriately used.

For example, the electrodes may each be a thin metal electrode formed by plating, sputtering, vapor deposition, or the like or gold foil. Alternatively, the electrodes may each be a flexible film electrode containing a conductive material, an electrolyte, and a polymer and formed by a casting method or the like. The electrodes may each be a flexible gel electrode described in Patent Literature 1, the flexible gel electrode containing carbon nanotubes, an ionic liquid, and a binder polymer.

The thickness of the metal electrode is not particularly limited as long as the extensional deformation of the actuator is not inhibited. The thickness of each metal electrode may be 10 nm or more and 5 mm or less, such as 30 nm or more and 2 mm or less, and even 80 nm or more and 500 µm or less. According to one aspect, an electrode thickness of less than 10 nm may not be provided because a problem in terms of electrical conductivity of the electrode of an actuator may occur. When the thickness of the electrode exceeds 5 mm, the electrode becomes hard and may inhibit deformation of the actuator element. The thicknesses and the materials of the anode electrode and the cathode electrode need not be the same and can be appropriately selected in accordance with predetermined actuator characteristics.

Also in the case of the flexible electrodes (flexible film electrodes or flexible gel electrodes), the thickness of the electrode is not particularly limited as long as the extensional deformation of the actuator is not inhibited. The thickness of each flexible electrode may be 1 µm or more and 5 mm or less, such as 5 µm or more and 2 mm or less, and even 10 µm or more and 500 µm or less. According to one aspect, an electrode thickness of less than 1 µm may not be provided because problems in terms of the ease of preparation of the electrode and electrical conductivity of the electrode of an actuator may occur. According to one aspect, a thickness of the electrode of more than 5 mm may not be provided because the electrode containing a conductive material may become hard and brittle and may be easily broken. The flexible electrode may further have a metal electrode on a surface thereof.

The electrodes may have any shape such as a square shape or an elliptical shape. However, in the case where the electrode has a long shape, a dimension in a direction from one end to another end of the electrode may be long from the standpoint that a large amount of displacement can be obtained by the deformation during driving of the actuator.

Intermediate Layer and Insulating Layers

In the actuator according to an embodiment of the present invention, the intermediate layer and the insulating layers are not particularly limited as long as the relationships of the dielectric constants and the film thicknesses of the intermediate layer and the insulating layers satisfy formula F and formula H described above and the intermediate layer is a film containing at least an ionic liquid.

(Intermediate Layer)

For example, a film prepared by impregnating a polymer material known as an electrolyte film with an ionic liquid and a gel film containing a polymer material and an ionic liquid, the gel film being described in Patent Literature 1, can be widely used as the intermediate layer. From the standpoint of the ion migration efficiency by application of a voltage, the intermediate layer may have a high porosity. The intermediate layer may be formed by impregnating a porous film comprising polymer fibers with an ionic liquid.

Examples of the polymer material include fluorine-containing polymers such as polytetrafluoroethylene and polyvinylidene fluoride; polyolefin polymers such as polyethylene and polypropylene; polybutadiene compounds; polyurethane compounds such as polyurethane elastomers and polyurethane gel; silicone compounds; thermoplastic polystyrene; polyvinyl chloride; and polyethylene terephthalate. These polymers may be used alone or in combination of a plurality of polymers. These polymers may be functionalized or may be copolymerized with other polymers.

It is necessary that the intermediate layer contain at least an ionic liquid. Accordingly, ions are migrated by applying a voltage between electrodes, and the actuator is bent and deformed.

A polyvinylidene fluoride-hexafluoropropylene copolymer [PVDF(HFP)], polyvinylidene fluoride (PVDF), perfluorosulfonic acid (Nafion), 2-hydroxyethyl methacrylate (HEMA), polymethyl methacrylate (PMMA), polyethylene oxide (PEO), and polyacrylonitrile (PAN) etc. may be used as the polymer because these polymers tend to have a high affinity with ionic liquids. In an embodiment of the present invention, at least one compound selected from these compounds is suitably used.

Known electrolytes may be added to the ionic liquid. Examples of the electrolytes include lithium fluoride, lithium bromide, sodium bromide, magnesium chloride, copper sulfate, sodium acetate, and sodium oleate.

The ionic liquid used in the actuator according to an embodiment of the present invention is also referred to as "room-temperature molten salt" or is simply referred to as "molten salt", or the like. The ionic liquid is a salt that exhibits a molten state over a wide temperature range including normal temperature (room temperature), that is, a salt that exhibits a molten state, for example, at 0° C., such as at −20° C., and even at −40° C. According to one aspect, the ionic liquid has high ionic conductivity.

In the actuator according to an embodiment of the present invention, various known ionic liquids can be used and the ionic liquid is not particularly limited. However, stable ionic liquids that exhibit a liquid state at normal temperature (room temperature) or at temperatures close to normal temperature are suitably used. Examples of the ionic liquid suitably used in the actuator according to an embodiment of the present invention include imidazolium salts, pyridinium salts, ammonium salts, and phosphonium salts. Two or more of these ionic liquids may be used in combination.

More specifically, examples of the ionic liquid include ionic liquids containing any of cations (such as imidazolium ions) represented by general formulae (1) to (4) below and an anion (X⁻).

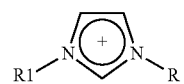

(1)

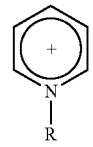

(2)

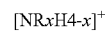

(3)

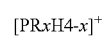

(4)

In general formulae (1) to (4), R represents an alkyl group having 1 to 12 carbon atoms or an alkyl group which has an ether bond and whose total number of carbon atoms and oxygen atoms is 3 to 12. In general formula (1), R1 represents an alkyl group having 1 to 4 carbon atoms or a hydrogen atom. In general formula (1), according to one aspect, R is not the same as R1. In general formulae (3) and (4), x each independently represents an integer of 1 to 4.

The anion (X⁻) may be at least one selected from tetrafluoroboric acid anion, hexafluorophosphoric acid anion, bis(trifluoromethanesulfonyl)imidic acid anion, perchloric acid anion, tris(trifluoromethanesulfonyl)carbon acid anion, trifluoromethanesulfonic acid anion, dicyanamide anion, trifluoroacetic acid anion, an organic carboxylic acid anion, and a halogen ion.

The thickness of the intermediate layer may be 10 μm or more and 500 μm or less, such as 10 μm or more and 400 μm or less. When the thickness of the intermediate layer exceeds 500 μm, the elastic modulus of the intermediate layer increases and the deformation movement of the actuator may be suppressed. When the thickness of the intermediate layer is less than 10 μm, the amount of ionic substance that can be retained is small, and thus the amount of ionic substance supplied to ion adsorption portions is decreased. Consequently, a sufficient bending movement may not be performed.

(Ion Adsorption Portion)

The intermediate layer according to an embodiment of the present invention may have an ion adsorption portion containing at least a nano-carbon material at at least one interface contacting the insulating layer. Specifically, as illustrated in FIG. 2, a seven-layer-structured actuator includes insulating layers and an intermediate layer having ion adsorption portions containing at least a nano-carbon material at interfaces contacting the insulating layers. In the case where the ion adsorption portion is provided on each of the interfaces contacting the insulating layers, a high effect can be achieved in terms of improvement in the force generated by the actuator. From the standpoint of the specific surface area, it is necessary that the ion adsorption portion contain at least a nano-carbon material. Examples of the nano-carbon material include carbon whisker (gas-phase-grown carbon), nano-carbon fibers, activated carbon, carbon nanoparticles, graphene, and carbon nanotubes (CNTs). In particular, it is effective that the ion adsorption portion contains a nano-carbon material having a large specific surface area for adsorption, such as carbon nanotubes or graphene. The ion adsorption portion may be impregnated with an ionic liquid. The ion adsorption portion may comprise a gel containing carbon nanotubes (CNTs) and an ionic liquid as described in Patent Literature 1.

Carbon nanotubes (CNTs), which are an example of the nano-carbon material used in the actuator according to an embodiment of the present invention, have a structure in which a sheet of graphite is rolled to have a cylindrical shape, and the diameter of the cylinder is 1 to 10 nm. Carbon nanotubes used in the actuator according to an embodiment of the present invention are a carbon material having a shape in which a graphene sheet is rolled to have a cylindrical shape, and are broadly classified into single-walled carbon nanotubes (SWCNTs) and multi-walled carbon nanotubes (MWCNTs) from the standpoint of the number of peripheral walls of the carbon nanotubes. Thus, various types of carbon nanotubes are known. In the actuator according to an embodiment of the present invention, any type of so-called carbon nanotubes can be used.

Carbon nanoparticles, which are an example of the nano-carbon material, are nano-scale ($10^{-6}$ to $10^{-9}$ m) particles that are mainly composed of carbon and that are not carbon nanotubes, such as carbon nanohorns, amorphous carbon, or fullerene. Carbon nanohorns refer to carbon nanoparticles each of which has a shape obtained by rolling a graphite sheet so as to form a circular cone and has a closed end such as the end of a circular cone.

Nano-carbon fibers, which are an example of the nano-carbon material used in the actuator according to an embodiment of the present invention, have a structure in which a sheet of graphite is rolled to have a cylindrical shape and the diameter of the cylinder is 10 to 1,000 nm, and are also referred to as carbon nanofibers. Carbon nanofibers are carbon fibers each of which has a fiber diameter of 75 nm or more and a hollow structure and which have a large number of branched structures. Examples of commercially available carbon nanofibers include VGCF and VGNF produced by Showa Denko K.K.

Graphene, which is an example of the nano-carbon material used in the actuator according to an embodiment of the present invention, is a part of a graphite structure. Graphene refers to an aggregation of carbon atoms in which carbon six-membered rings having a planar structure are two-dimensionally arrayed, that is, refers to a material composed of a single carbon layer.

The ion adsorption portion may further contain known carbon materials and conductive polymers depending on the predetermined performance of the actuator. The other carbon materials and the conductive polymers may be used alone or as a mixture thereof. Examples of the other carbon materials usually include graphite, carbon black, acetylene black, Ketjenblack, and activated carbon fibers.

Among these carbon materials, Ketjenblack may be contained in the ion adsorption portion because Ketjenblack comprises carbon fine particles having a large specific surface area of 800 to 1,300 $m^2/g$ and has a large number of sites to which ions can be adsorbed.

The amount of nano-carbon material added to the ion adsorption portion of the actuator according to an embodiment of the present invention may be 1% by weight or more of the weight of the ion adsorption portion. When the amount of nano-carbon material is 1% by weight or more of the weight of the ion adsorption portion, the nano-carbon material can effectively function as the ion adsorption portion. When the amount of nano-carbon material is less than 1% by weight, a sufficient ion adsorption capability may not be obtained.

The ion adsorption portion may contain a binder polymer. The binder polymer is not particularly limited as long as the binder polymer has flexibility so as to be deformed by the deformation of the actuator. According to one aspect, the binder polymer has low hydrolyzability and is stable in the atmosphere. Examples of the polymer include olefin polymers such as polyethylene and polypropylene; polystyrene; polyimide; polyarylenes (aromatic polymers) such as polyparaphenylene oxide, poly(2,6-dimethylphenylene oxide), and polyparaphenylene sulfide; polymers obtained by introducing a sulfonic acid group (—SO₃H), a carboxyl group (—COOH), a phosphate group, a sulfonium group, an ammonium group, a pyridinium group, or the like into polystyrene, polyimide, polyarylenes (aromatic polymers), or the like; fluorine-containing polymers such as polytetrafluoroethylene and polyvinylidene fluoride; perfluorosulfonic acid polymers, perfluorocarboxylic acid polymers, perfluorophosphoric acid polymers, and the like obtained by introducing a sulfonic acid group, a carboxyl group, a phosphate group, a sulfonium group, an ammonium group, a pyridinium group, or the like into the backbone of fluorine-containing polymers; polybutadiene compounds; polyurethane compounds such as polyurethane elastomers and polyurethane gel; silicone compounds; polyvinyl chloride; polyethylene terephthalate; nylon; and polyarylates. These polymers may be used alone or in combination of a plurality of polymers. These polymers may be functionalized or may be copolymerized with other polymers.

From the standpoint of affinity with ionic liquids, examples of polymers include polyvinylidene fluoride-hexafluoropropylene copolymers [PVDF(HFP)], polyvinylidene fluoride (PVDF), and polymethyl methacrylate (PMMA).

The Young's modulus of the ion adsorption portion in the actuator according to an embodiment of the present invention may be 0.1 to 600 MPa. When the Young's modulus of the ion adsorption portion is within this range, in an application of the actuator, flexibility and elasticity of the ion adsorption portion improve and thus the plastic deformation resistance improves. Accordingly, an ion migration-type actuator having high repetitive endurance can be prepared.

The ion adsorption portion may contain a component other than the polymer and the nano-carbon material described above as long as the component does not adversely affect the function of the actuator. The amount of polymer incorporated may be 10% by weight or more and 60% by weight or less. From the standpoint of adsorption of ions, the ratio of the amount of carbon material to the amount of polymer may be higher. When the amount of polymer is less than 5% by weight, the ion adsorption portion may not have a self-standing property and may be mechanically brittle. When the amount of polymer exceeds 80% by weight, the amount of nano-carbon material incorporated is relatively small. Accordingly, it may be difficult to practically use the resulting actuator from the standpoint of the response speed of the actuator, the force generated by the actuator, etc.

The thickness of the ion adsorption portion is not particularly limited as long as the extensional deformation of the actuator is not inhibited. The thickness of each of the ion adsorption portions may be 1 μm or more and 5 mm or less, such as 5 μm or more and 2 mm or less, and even 10 μm or more and 500 μm or less. When the thickness of each ion adsorption portion is less than 1 μm, the ion adsorption portion of the actuator may have a problem in terms of an ion accumulation capability. When the thickness of the ion adsorption portion exceeds 5 mm, the ion adsorption portion containing a nano-carbon material becomes hard, and may become brittle and be easily broken. The thicknesses and the materials of the ion adsorption portions need not be the same and can be appropriately selected in accordance with predetermined actuator characteristics.

(Insulating Layers)

As described above, the insulating layers are not particularly limited as long as formula F and formula H are satisfied. However, the insulating layers may be highly dielectric insulating thin films from the standpoint of a polarization orientation characteristic and a polarization inversion characteristic of the insulating layers.

Herein, the term "highly dielectric" means that an insulating film has a dielectric constant of 8 or more at 25° C. at 1 kHz, such as 10 to 10,000, and even 20 to 2,000, though the dielectric constant depends on the film thickness and the value of resistance. In general, the dielectric constant of a polymer insulating film is not high, namely, at most about 6. Therefore, in order to improve the dielectric performance of an insulating film, it is necessary to fill the insulating film with a large amount of dielectric having a high dielectric constant as much as possible, or it is necessary to use a special polymer material having a high dielectric constant. The insulating film may be prepared by using a ferroelectric material. When a voltage is applied to a ferroelectric material, electric dipoles in the material are satisfactorily arranged in a direction of the electric field. The orientation of the dipoles can be satisfactorily inverted by applying an electric field.

The highly dielectric insulating layers in an embodiment of the present invention are not particularly limited, and known highly dielectric insulating layers can be appropriately used. For example, the highly dielectric insulating layers may each be a hybrid film containing highly dielectric inorganic particles and an organic polymer material. Alternatively, known highly dielectric polymer films may be used alone or in combination. In the case of the organic/inorganic hybrid film, fine particles are preferably used as the highly dielectric inorganic particles because the film can be formed with an improved uniform dispersion efficiency of the inorganic particles in the organic polymer. In addition, it may also be the case that the organic polymer material has a low affinity with ionic liquids.

Highly dielectric polymers may be used as the highly dielectric insulating layer according to an embodiment of the present invention. The highly dielectric polymers may be used alone or as a mixture of two or more polymers. Alternatively, these highly dielectric polymers may be used in combination with highly dielectric inorganic particles.

In the case where the highly dielectric insulating layers are solely composed of a highly dielectric polymer, or in the case where the highly dielectric insulating layers are obtained by mixing a highly dielectric polymer with other organic polymer materials, the highly dielectric insulating layers can have higher flexibility due to the characteristics of the organic material. Therefore, the actuator including the highly dielectric insulating layers according to an embodiment of the present invention is advantageous in that when a voltage equal to or higher than the potential window of an ionic liquid is applied, the actuator can be bent and deformed with a large amount of displacement while a large force can be generated by the actuator.

The thickness of each of the highly dielectric insulating layers may be 2 μm or more and 50 μm or less, and even 3 μm or more and 10 μm or less. When the thickness of the highly dielectric insulating layer exceeds 50 μm, the elastic modulus of the insulating layer is large, and the deformation movement of the actuator may be inhibited. When the thickness of the highly dielectric insulating layer is less than 2 μm, pin holes may be formed during preparation of the insulating layer. In addition, in such a case, since the thickness of the insulating layer is excessively small, a large amount of leakage current may flow. Thus, a satisfactory insulating effect to a high voltage is not obtained, and thus a strong electric field cannot be applied to the actuator element.

Step of Forming Highly Dielectric Insulating Layers

The material of the highly dielectric insulating layers of this embodiment is not particularly limited. A mixture of an organic polymer (insulating organic polymer) that is generally known as the material of a typical insulating layer (film) and highly dielectric inorganic particles may be used. Alternatively, known highly dielectric organic/polymer materials may be used alone or in an appropriate combination. The dielectric constant can be adjusted by appropriately selecting the insulating organic polymer or by adjusting the mass ratio of the insulating organic polymer to the inorganic particles. The amount of highly dielectric inorganic particles may be 10% by weight or more and 90% by weight or less relative to the amount of organic polymer. From the standpoint of the effect of a high dielectric property, the ratio of the amount of highly dielectric inorganic particles to the amount of organic polymer may be higher. However, when the amount of organic polymer is less than 5% by weight, the resulting highly dielectric insulating layer may not have a self-standing property and may be mechanically brittle. On the other hand, when the amount of organic polymer exceeds 90% by weight, the amount of highly dielectric inorganic particles incorporated is relatively small. Accordingly, it may be difficult to practically use the resulting actuator from the standpoint of the force generated by the actuator, the symmetric property in AC drive, etc. The highly dielectric insulating layer may contain a component other than the organic polymer and the highly dielectric inorganic particles as long as the component does not adversely affect the function of the actuator.

Known methods for forming a film can be appropriately employed as a method for forming the highly dielectric insulating layers. In particular, a wet method can be employed. The wet method is a method including, for example, preparing a solution by mixing the insulating organic polymer and highly dielectric inorganic particles that form the highly dielectric insulating layer (film) in the presence of a solvent, casting the solution, and then removing the solvent to form a film. The solvent can be appropriately selected from known solvents in accordance with the organic polymer compounds used etc. Examples of the wet method include spin coating, blade coating, dip coating, roll coating, bar coating, die coating, screen printing, and ink-jet printing. Alternatively, for example, printing methods called soft lithography such as microcontact printing or micromolding may also be employed. Among these wet methods, spin coating may be provided.

The highly dielectric inorganic particles are not particularly limited as long as the inorganic particles have a positive ion and a negative ion in their crystal structure to form electric dipoles. According to one aspect, examples of the highly dielectric inorganic particles are particles of high dielectric ceramics. Examples of the high dielectric ceramics that can be used include perovskite-type compounds such as lead titanate ($PbTiO_3$), lead zirconate titanate (PZT), lanthanum-doped lead zirconate titanate (PLZT), barium titanate ($BaTiO_3$), and lithium niobate ($LiNbO_3$); tungsten bronze structure compounds such as lead metaniobate ($PbNb_2O_6$) and bismuth tungstate ($Bi_2WO_6$); bismuth layer-structured compounds such as bismuth lanthanum titanate (BLT); wurtzite (wurtzite-type) structure crystals; zinc oxide (ZnO); quartz crystal ($SiO_2$); and Rochelle salt ($NaK(C_4H_4O_6).4H_2O$). At least one compound may be selected from these compounds. Among these, highly dielectric inorganic particles containing calcium titanate or barium titanate as a main component may be provided from the standpoint of a high dielectric constant and availability. These highly dielectric inorganic particles may be used alone or as a mixture of two or more types of particles. From the standpoint of dispersibility, in general, highly dielectric inorganic nanoparticles are suitably used as the highly dielectric inorganic particles. From the standpoint of dispersibility, the nanoparticles usually have an average particle diameter of 500 nm or less, such as 1 to 100 nm. The dielectric constant can be measured in accordance with JIS K 6911. The average particle diameter can be measured by a dynamic light scattering method.

Highly dielectric polymers may also be used. Known highly dielectric polymers can be appropriately used alone or in combination. Examples thereof include nylon 11, and nylon 79, polyurea 9, polythiourea 9, polyurethane 37, polycyanophenylene sulfide, polyvinylidene cyanide, polyacrylonitrile, poly β-propiolactone, polyacetic acid, and polyalginic acid, which are described in Journal of the Society of Fiber Science and Technology, Japan, Vol. 59, No. 10, P. 30 (2003). Highly dielectric polymer liquid crystals may also be used. Examples of the highly dielectric polymer liquid crystals that can be used include side-chain highly dielectric polymer liquid crystals described in Japanese Patent Laid-Open No. 2000-81627, the polymer liquid crystals including a main chain such as a polyacrylate main chain, a polymethacrylate main chain, a polychloroacrylate main chain, a polyoxirane main chain, a polyester main chain, a polysiloxane-olefin main chain, or the like and a liquid crystalline side chain. These highly dielectric polymer liquid crystals usually have a weight-average molecular weight in the range of 1,000 to 1,000,000, such as a weight-average molecular weight in the range of 1,000 to 100,000.

In addition, polymer liquid crystals having a chiral smectic phase, specifically, the 5 mC* phase, the SmH* phase, the SmI* phase, the SmJ* phase, or the SmG* phase, the polymer liquid crystals being described in Japanese Patent Laid-Open No. 5-5905, may also be used. Furthermore, optically active polymer liquid crystals that can exhibit a highly dielectric property by blending or the like, the polymer liquid crystals being described in Japanese Patent Laid-Open No. 5-5905, may also be used.

Japanese Patent Laid-Open No. 9-63905 describes that, in an electric double-layer capacitor, a covering layer composed of silicon oxide or a metal oxide and having a very small thickness (1 μm or less) is formed on at least a part of a surface of activated carbon functioning as a polarizable electrode, thereby covering active points of the activated carbon.

Among the highly dielectric polymers, ferroelectric polymers may be provided because of their high dielectric constants. Examples of the ferroelectric polymers include polyvinylidene fluoride (PVdF) and copolymers (PVdF(TrFE)) of polyvinylidene fluoride and trifluoroethylene (TrFE). Highly dielectric insulating layers may be prepared by using one or a plurality of ferroelectric polymers or using a ferroelectric polymer as a mixture with other polymers. An actuator including such highly dielectric insulating layers is advantageous in that when a voltage equal to or higher than the potential window of an ionic liquid is applied, the actuator can be bent and deformed with a large amount of displacement while a large force can be generated by the actuator.

In an embodiment of the present invention, an electric double layer as a capacitor need not be formed, and the thickness of each of the covering layers (i.e., ion adsorption portions) can be 1 μm or more. In addition, the insulating layers can each be formed as a dense film having a uniform thickness. By forming the insulating layers having a high dielectric constant, the loss of the potential difference in portions of the insulating layers is not generated, and a potential difference larger than the potential window of an ionic liquid (intense electric field) can be applied to the intermediate layer of the actuator.

A plurality of actuators according to an embodiment of the present invention may be integrated, and a voltage applying unit configured to individually apply a voltage to each electrode of the actuators may be provided. Thus, a driving device that extracts the deformation of each of the actuators as a driving force can be provided.

Method for Preparing Actuator

Any method may be employed as a method for preparing an actuator according to an embodiment of the present invention as long as the actuator described above can be prepared. For example, a metal electrode is formed on a surface of a highly dielectric insulating layer by a sputtering method. Thus, two highly dielectric insulating layers each having a metal electrode thereon are prepared. The two highly dielectric insulating layers each having a metal electrode thereon and an intermediate layer may be stacked and pressure-bonded by hot pressing or may be stacked using an adhesive. By using an adhesive, the actuator can be more easily prepared without using a large-scale apparatus.

According to an embodiment of the present invention, the shape of the actuator is not limited to a strip shape, and an actuator element having any shape can be easily produced.

EXAMPLES

Examples of the present invention will now be described.
Evaluation of Performance of Actuator A force generated in a bending movement of an actuator was evaluated using a load cell for a very small force (UL-10GR, produced by Minebea Co., Ltd.).

Specifically, an actuator having a strip shape was prepared so as to have a width of 3 mm, a length of 12 mm, and a predetermined thickness. A portion 2 mm away from a longitudinal end of the actuator was held by a holder (terminal) of a fixing device, the holder having platinum electrodes. A certain voltage was applied to the actuator in air to cause a bending movement of the actuator. The force generated at a position 2 mm away from the fixed end of the actuator was measured with the load cell.

The symmetric property in driving of an actuator was evaluated as follows. An actuator having predetermined dimensions was prepared, and a portion 1 mm away from an end of the actuator was held by a holder (terminal) of a fixing device, the holder having platinum electrodes. A voltage was applied to the actuator in air, and the amount of displacement in the deformation response of the actuator was measured at a position (actuator measurement point) 7 mm away from the fixed end using a laser displacement meter. The distance between the actuator (actuator measurement point) and the laser displacement meter was set to 6 mm.

Example 1

(Actuator Having Five-Layer Structure of Electrode/Highly Dielectric Insulating Layer/Intermediate Layer/Highly Dielectric Insulating Layer/Electrode)

An actuator illustrated in FIG. 1 and having a five-layer structure of electrode/highly dielectric insulating layer/intermediate layer/highly dielectric insulating layer/electrode was produced in Example 1. Specifically, the actuator has a structure in which highly dielectric insulating layers are each interposed between an electrode and an intermediate layer.

The highly dielectric insulating layers were each prepared by the following method.

First, a barium titanate powder (particle size: 100 nm, produced by Aldrich) serving as a high dielectric ceramic was dispersed in an organic solvent (dimethylacetamide (DMAc)) by ultrasonic waves for four hours. Polyvinylpyrrolidone (PVP, weight-average molecular weight: 1,300,000, produced by Aldrich) serving as a binder polymer was added thereto. In this step, PVP was added so that the amount of barium titanate powder was 60% by weight relative to the amount of PVP. Subsequently, the resulting mixed liquid was further dispersed by ultrasonic waves for three hours.

The resulting dispersed mixed liquid was poured into a mold composed of polytetrafluoroethylene (PTFE), and the surface of the liquid was planarized with a blade or the like. The dispersed mixed liquid was then dried in a vacuum at room temperature, thus preparing a highly dielectric insulating layer (film) in which the highly dielectric ceramic powder was uniformly dispersed and which had a uniform thickness. The insulating layer had a thickness of 10 μm. The insulating layer had a dielectric constant of 100.

Next, a platinum electrode was deposited on one surface of the prepared highly dielectric insulating layer (film) by a sputtering method. The thickness of the platinum electrode was about 60 nm.

The intermediate layer was prepared by the following method. The intermediate layer was formed as a polymer fiber film containing an ionic liquid. Specifically, first, 800 mg of a polyvinylidene fluoride-hexafluoropropylene copolymer ((PVDF-HFP), produced by Kanto Chemical Co., Inc.) serving as a base material, 20 mg of 1-butyl-3-methylimidazolium tetrafluoroborate (BMIBF$_4$, produced by Kanto Chemical Co., Inc., potential window: 4 V) serving as an ionic liquid, and 3.2 mL of a mixture of acetonitrile (AcCN) and N,N-dimethylformamide (DMF) (AcCN/DMF=1.9/1.4) serving as an organic solvent were mixed at 80° C. under heating. The resulting mixed solution was ejected using an electrospinning device (produced by MECC Co., Ltd.) to form fibers. In this step, a voltage of 25 kV was applied to a spinning nozzle of the electrospinning device.

Next, a polymer fiber film accumulated in a collector was impregnated with BMIBF$_4$ to obtain a corresponding intermediate layer. The thickness of the intermediate layer was 100 μm. The polymer fibers had an average fiber diameter of about 160 nm. The formation of a porous film composed of the polymer fibers was confirmed by scanning electron microscopy (SEM). The dielectric constant of the intermediate layer was 10.

As in the stacked film of the platinum electrode/highly dielectric insulating layer obtained above, the prepared intermediate layer was stacked on the stacked films with an acrylic spray adhesive. The resulting stacked film was cut to have a predetermined size. Thus, an actuator having a five-layer structure of electrode/highly dielectric insulating layer/intermediate layer/highly dielectric insulating layer/electrode was obtained.

Example 2

(Actuator Having Seven-Layer Structure of Electrode/Highly Dielectric Insulating Layer/Ion Adsorption Portion/Intermediate Layer/Ion Adsorption Portion/Highly Dielectric Insulating Layer/Electrode)

In Example 2, a seven-layer-structured actuator was produced in which the intermediate layer of the actuator of Example 1 had ion adsorption portions composed of at least a nano-carbon material at interfaces contacting the insulating layers. The electrodes, the highly dielectric insulating layers, and the intermediate layer were prepared as in Example 1.

The ion adsorption portions were each prepared by the following method. First, 50 mg of single-walled carbon nanotubes (SWNTs, produced by Unidym, "HiPco") serving as a nano-carbon material, 100 mg of an ionic liquid (BMIBF$_4$, potential window: 4 V), and 1 mL of an organic solvent (DMAc) were put in a container.

Zirconia balls having a diameter of 2 mm were added up to ⅓ of the volume of the container, and a dispersion treatment was conducted using a ball mill device (planetary particle pulverizer produced by Fritsch) at 200 rpm for 30 minutes.

Subsequently, a solution prepared by dissolving 80 mg of PVdF-HFP serving as a base material in 2 mL of DMAc under heating was added to the container, and a dispersion treatment was further conducted at 500 rpm for 60 minutes.

The resulting mixed liquid was poured into a mold composed of PTFE, and the surface of the liquid was planarized with a blade or the like. The mixed liquid was then dried in a vacuum at room temperature, thus preparing an ion adsorption portion in which the nano-carbon material was uniformly dispersed and which had a uniform thickness.

The ion adsorption portion prepared above was cut to have a predetermined size. The ion adsorption portion was arranged on both sides of the intermediate layer prepared as in Example 1. The ion adsorption portions were pressure-bonded in this state at 110° C. at a pressure of 0.5 kN for one minute, thus obtaining a corresponding laminate. The laminate was immersed in an ionic liquid (BMIBF$_4$, potential window: 4 V) for one hour and then dried in a vacuum for about 12 hours. Each of the ion adsorption portions had a thickness of 30 μm. The laminate had a dielectric constant of 13. Next, the stacked films each having a structure of electrode/highly dielectric insulating layer prepared in Example 1 were stacked on both sides of the prepared laminate having a structure of ion adsorption portion/intermediate layer/ion adsorption portion using an adhesive spray. Thus, an actuator having a seven-layer structure of electrode/highly dielectric insulating layer/ion adsorption portion/intermediate layer/ion adsorption portion/highly dielectric insulating layer/electrode was obtained.

Comparative Example 1

(Actuator Having Three-Layer Structure of Electrode/Intermediate Layer/Electrode)

An actuator having a three-layer structure of electrode/intermediate layer/electrode was prepared on the basis of Patent Literature 1.

The intermediate layer was formed as follows. First, 100 mg of a polyvinylidene fluoride-hexafluoropropylene copolymer (PVDF-HFP) serving as a polymer was mixed with a mixed solvent of tetrahydrofuran (THF)/acetonitrile (5/1) and 100 mg of 1-butyl-3-methylimidazolium tetrafluoroborate ($BMIBF_4$, potential window: 4 V) serving as an ionic liquid under heating at 80° C. Subsequently, the resulting mixture was cast and then dried to form a film. The resulting intermediate layer was cut to have a predetermined size. The thickness of the intermediate layer was 100 μm.

A CNT film-like electrode was prepared as follows. First, 50 mg of single-walled carbon nanotubes (SWCNTs, produced by Unidym, "HiPco") having a diameter of about 1 nm and a length of 1 μm and serving as a conductive material, 80 mg of $BMIBF_4$, and 1 mL of dimethylformamide (DMF) were subjected to a ball-mill treatment for 30 minutes. Next, 80 mg of PVDF-HFP dissolved in 2 mL of DMF was added thereto, and a ball-mill treatment was then further conducted for 30 minutes. Thus, a black paste containing the CNTs dispersed therein was prepared. The black paste was cast on a Teflon (registered trademark) sheet, and was then dried. Thus, the film-like electrode was prepared. The prepared electrode was cut to have a predetermined size. The thickness of the electrode was 50 μm.

The film-like electrode was arranged on both sides of the intermediate layer prepared above. The electrodes were pressure-bonded to the intermediate layer in this state at 110° C. at a pressure of 0.5 kN for one minute. Thus, an actuator having a corresponding three-layer structure of electrode/intermediate layer/electrode was obtained. Evaluation results of actuator performance Table 1 shows the results of the applied voltage (difference in the potential applied between electrodes of an actuator element) and the generated force in Examples. Note that the generated force is represented as a value relative to Comparative Example 1 under the assumption that a value of Comparative Example 1, in which the existing three-layer stacked actuator was used, is a standard (a numerical value of 1).

TABLE 1

|  | Applied voltage (V) | Generated force (Relative value based on Comparative Example 1) |
| --- | --- | --- |
| Example 1 | ±10 | 3.5 |
| Example 2 | ±10 | 5.2 |
| Comparative Example 1 | ±3 | 1 |

First, Examples 1 and 2, which include insulating layers, are compared with Comparative Example 1. Regarding the actuators including the insulating layers (Examples 1 and 2), even when a high voltage of ±10 V was applied, the actuators were stably driven and the drive voltage was significantly improved compared with the existing three-layer-structured actuator of Comparative Example 1 to which a voltage higher than the potential window of an ionic liquid (4 V in the case of $BMIBF_4$) cannot be applied. It was confirmed that, in the structures according to embodiments of the present invention, since each of the electrodes and the intermediate layer containing the ionic liquid do not directly contact with each other, a potential difference larger than the potential window of the ionic liquid can be applied to the actuator element.

In addition, on the basis of formula X above, it is confirmed that, in Examples 1 and 2, potential differences (Example 1: 9.80 V, Example 2: 9.84 V) significantly larger than the potential window of the ionic liquid were applied to the intermediate layer without a loss from the potential difference applied to the actuator elements. Furthermore, the degree of degradation of the ionic liquid in the driven actuator elements was examined by nuclear magnetic resonance spectrometry. According to the results, the ionic liquid was not degraded.

It was found that the forces generated by the actuators in Examples 1 and 2 including the highly dielectric insulating layers composed of a high dielectric ceramic and a resin were significantly larger than the force generated by the existing three-layer-structured actuator of Comparative Example 1 to which a potential difference larger than the potential window of the ionic liquid cannot be applied. In addition, an electric potential substantially the same as the large electric potential applied between the electrodes of the actuator element could be applied to the intermediate layer by providing the insulating layers composed of a high dielectric material (Example 1: 9.80 V, Example 2: 9.84 V). Specifically, in the case where the highly dielectric insulating layers are used, the insulating layers have a good dielectric constant, and thus the polarization orientation efficiency in the insulating layers is high and an electric field can be efficiently applied to the intermediate layer. Thus, it was confirmed that, as a result, the cationic species and the anionic species of the ionic liquid could be more efficiently migrated to the vicinity of the interfaces with the insulating layers by application of the voltage, and a large force could be generated.

Furthermore, regarding the actuators of Examples 1 and 2 including the highly dielectric insulating layers, the force generated by the actuator of Example 2 including the ion adsorption portions composed of carbon nanotubes used as a nano-carbon material was larger than the force generated by the actuator of Example 1. Thus, it was also confirmed that a larger force could be generated by the actuator having the seven-layer structure of electrode/highly dielectric insulating layer/ion adsorption portion/intermediate layer/ion adsorption portion/highly dielectric insulating layer/electrode.

Figure 3A:
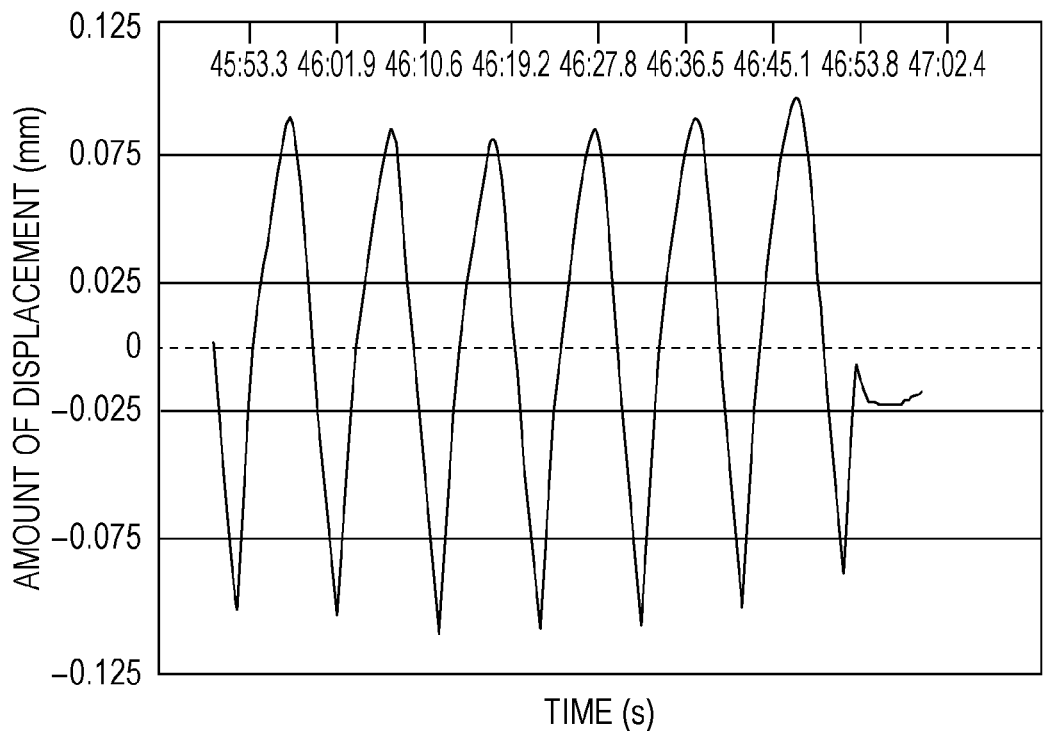
FIG. 3A is a graph showing displacement response characteristics in the case where an actuator having a five-layer structure of electrode/highly dielectric insulating layer/intermediate layer/highly dielectric insulating layer/electrode according to an embodiment of the present invention was driven at ±20V and 0.1 Hz.

In addition, regarding the actuators of Examples 1 and 2 including the highly dielectric insulating layers, the symmetric property in AC drive (0.1 Hz) was also satisfactory. Regarding the symmetric property in AC drive (drive symmetry), the measurement with the laser displacement meter also showed that each of the actuators was symmetrically deformed with respect to an alternating electric field. FIG. 3A shows, as an example of the results showing a good symmetric property in AC drive, displacement response characteristics in the case where the actuator of Example 1 having the five-layer structure of electrode/highly dielectric insulating layer/intermediate layer/highly dielectric insulating layer/electrode was driven at 0.1 Hz at ±20 V.

Figure 3B:
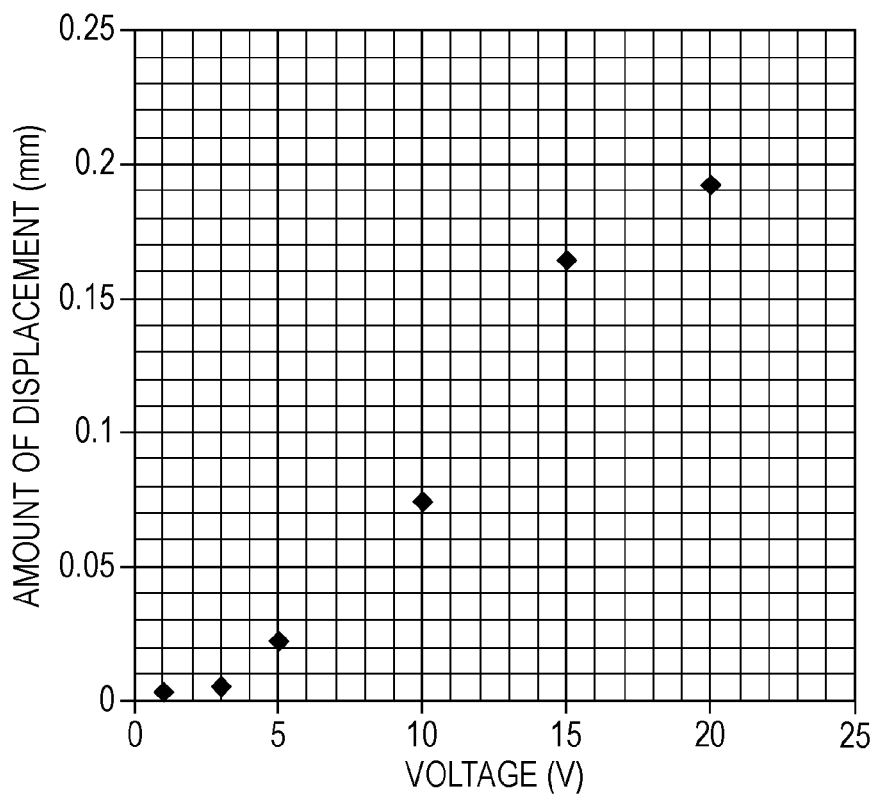
FIG. 3B is a graph showing a relationship between the applied voltage and the amount of displacement in the case where the five-layer-structured actuator was driven at 0.1 Hz.

FIG. 3B shows displacement response characteristics in the case where the actuator of Example 1 having the five-layer structure of electrode/highly dielectric insulating layer/intermediate layer/highly dielectric insulating layer/electrode was driven at 0.1 Hz in a range of ±1 V to ±20 V. The results also show an effect of an improvement of the drive performance of the actuator with an increase in the applied voltage.

Since the actuators of the Examples were stably driven even when a voltage of ±20 V was applied, the dielectric breakdown electric field of the actuators of the Examples was higher than ±20 V. Accordingly, the actuators of the Examples each have a structure that satisfies Formula H above.

Furthermore, each the actuators of the Examples was stably driven at ±10 V 5,000 times or more. Thus, it was also confirmed that good driving stability and endurance can be achieved by embodiments of the present invention.

Example 3

(Actuator Having Seven-Layer Structure of Electrode/Insulating Layer Composed of Ferroelectric Polymer/Ion Adsorption Portion/Intermediate Layer/Ion Adsorption Portion/Insulating Layer Composed of Ferroelectric Polymer/Electrode)

A seven-layer-structured actuator of Example 3 was prepared as in Example 2 except that the highly dielectric insulating layers of the actuator were composed of a ferroelectric polymer and the nano-carbon material contained in the ion adsorption portions was Ketjenblack instead of SWNT.

As the ferroelectric polymer, a polyvinylidene fluoride (PVdF) film (produced by Kureha Corporation, KF piezofilm) having a thickness of 20 μm was used instead of each of the highly dielectric insulating layers in Example 2, which contained barium titanate. The PVdF film had a dielectric constant of 13.

The ion adsorption portions were each prepared as in Example 2 except that 30 mg of Ketjenblack (produced by Lion Corporation, ECP600JD) was used instead of 50 mg of the SWNTs in Example 2. The resulting ion adsorption portions contained the Ketjenblack that are uniformly dispersed therein and had a thickness of 65 p.m.

The stacking of the actuator of Example 3, which had a seven-layer structure of electrode/insulating layer composed of ferroelectric polymer/ion adsorption portion/intermediate layer/ion adsorption portion/insulating layer composed of ferroelectric polymer/electrode was performed by the same method as in Example 2.

Evaluation Results of Performance of Actuator

Table 2 shows the results of the applied voltage (difference in the potential applied between electrodes of an actuator element), the generated force, and the amount of displacement in Examples 1 and 2 and Comparative Example 1. Note that the generated force and the amount of displacement are each represented as a value relative to Comparative Example 1 under the assumption that a value of Comparative Example 1, in which the existing three-layer stacked actuator was used, is a standard (a numerical value of 1).

TABLE 2

|  | Applied voltage (V) | Generated force (Relative value based on Comparative Example 1) | Amount of displacement (Relative value based on Comparative Example 1) |
| --- | --- | --- | --- |
| Example 2 | ±10 | 5.2 | 0.2 |
| Example 3 | ±10 | 3 | 0.8 |
| Comparative Example 1 | ±3 | 1 | 1 |

First, Example 3, which includes insulating layers, is compared with Comparative Example 1. Regarding the actuator including the insulating layers (Example 3), even when a high voltage of ±10 V was applied, the actuator was stably driven and the drive voltage was improved compared with the existing three-layer-structured actuator of Comparative Example 1 to which a voltage higher than the potential window of an ionic liquid (4 V in the case of BMIBF$_4$) cannot be applied. It was confirmed that, in the structure according to an embodiment of the present invention, since each of the electrodes and the intermediate layer containing the ionic liquid do not directly contact with each other, a potential difference larger than the potential window of the ionic liquid can be applied to the actuator element.

In addition, on the basis of formula X above, it is confirmed that, in Example 3, a potential difference (Example 3: 8.82 V) significantly larger than the potential window of the ionic liquid was applied to the intermediate layer without a loss from the potential difference applied to the actuator element. Furthermore, the degree of degradation of the ionic liquid in the driven actuator element was examined by nuclear magnetic resonance spectrometry. According to the results, the ionic liquid was not degraded.

The force generated by the actuator in Example 3 including the dielectric insulating layers composed of a ferroelectric polymer was significantly larger than the force generated by the existing three-layer-structured actuator of Comparative Example 1 to which a potential difference larger than the potential window of the ionic liquid cannot be applied. In addition, an electric potential significantly larger than the potential window of the ionic liquid could be applied to the intermediate layer by using the insulating layers composed of a high dielectric material. Specifically, in the case where the highly dielectric insulating layers are used, the insulating layers have a good dielectric constant and thus the polarization orientation efficiency in the insulating layers is high and an electric field can be efficiently applied to the intermediate layer. Thus, it was confirmed that, as a result, the cationic species and the anionic species of the ionic liquid could be more efficiently migrated to the vicinity of the interfaces with the insulating layers by application of the voltage, and a large force could be generated.

The amount of displacement of the actuator (Example 2) including the insulating layers composed of barium titanate, which is a high dielectric ceramic, was 0.2 times that of the actuator of Comparative Example 1. In contrast, the amount of displacement of Example 3 including the insulating layers composed of a flexible ferroelectric polymer was 0.8. Accordingly, it was also confirmed that an actuator including insulating layers composed of a ferroelectric polymer could realize a large amount of displacement while generating a large force.

The actuator of Example 3 was stably driven even when a voltage of ±20 V was applied. Accordingly, the actuator of Example 3 has a structure that satisfies Formula H above.

Examples of the present invention have been described above. However, the present invention is not limited to the Examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-246713 filed Nov. 10, 2011, which is hereby incorporated by reference herein in its entirety.

What is claimed is:

1. An actuator comprising:
a pair of electrodes facing each other;
an intermediate layer containing an ionic liquid and arranged between the pair of electrodes,
the electrodes and the intermediate layer being bent and deformed when a potential difference larger than a potential window of the ionic liquid is applied between the electrodes; and
insulating layers that suppress direct contact between ions of the ionic liquid and the electrodes, the insulating layers being arranged between the intermediate layer and the electrodes
wherein the insulating layers contain an insulating polymer and highly dielectric inorganic particles; and
wherein in the insulating layers, an amount of the highly dielectric inorganic particles may be 10% by weight or more and 90% by weight or less relative to an amount of the organic polymer.

2. The actuator according to claim 1, wherein the intermediate layer includes an ion adsorption portion comprising at least a nano-carbon material on a surface contacting the insulating layer.

3. The actuator according to claim 1, where the insulating layers contain a resin and high dielectric ceramic contained in the resin.

4. The actuator according to claim 3, wherein the high dielectric ceramic is at least one compound selected from lead titanate ($PbTiO_3$), lead zirconate titanate (PZT), lanthanum-doped lead zirconate titanate (PLZT), barium titanate ($BaTiO_3$), lithium niobate ($LiNbO_3$), lead metaniobate ($PbNb_2O_6$), bismuth tungstate ($Bi_2WO_6$), bismuth lanthanum titanate (BLT), wurtzite (wurtzite-type) structure crystals, zinc oxide (ZnO), quartz crystal ($SiO_2$), and Rochelle salt ($NaK(C_4H_4O_6) \cdot 4H_2O$).

5. The actuator according to claim 2, wherein the nano-carbon material contains at least one of a carbon nanotube and Ketjenblack.

6. The actuator according to claim 1, wherein the intermediate layer comprises a polymer material impregnated with an ionic liquid.

7. The actuator according to claim 6, wherein the polymer material contains at least one compound selected from a polyvinylidene fluoride-hexafluoropropylene copolymer [PVDF(HFP)], polyvinylidene fluoride (PVDF), perfluorosulfonic acid (Nafion), 2-hydroxyethyl methacrylate (HEMA), polymethyl methacrylate (PMMA), polyethylene oxide (PEO), and polyacrylonitrile (PAN).

8. The actuator according to claim 1, wherein the insulating layers comprise a ferroelectric polymer.

9. The actuator according to claim 8, wherein the ferroelectric polymer is polyvinylidene fluoride (PVdF) or a copolymer (PVdF(TrFE)) of polyvinylidene fluoride and trifluoroethylene (TrFE).

10. The ion migration-type actuator according to claim 1, wherein a thickness of each of the insulating layers is 2 μm or more and 50 μm or less.

11. The ion migration-type actuator according to claim 1, wherein the intermediate layer is formed as a polymer fiber film containing the ionic liquid.

* * * * *